United States Patent [19]

Vreeland

[11] Patent Number: 4,728,493
[45] Date of Patent: Mar. 1, 1988

[54] CHROMIUM BASED CORROSION RESISTANT HARD-FACING ALLOY

[75] Inventor: Donald C. Vreeland, Annapolis, Md.

[73] Assignee: The United States of America as represented by the Secretary of the Navy, Washington, D.C.

[21] Appl. No.: 37,906

[22] Filed: Apr. 13, 1987

[51] Int. Cl.$^4$ .................... C22C 27/06; C22C 30/00
[52] U.S. Cl. .................................. 420/428; 420/442; 420/588
[58] Field of Search .................. 420/428, 588, 442

[56] References Cited

U.S. PATENT DOCUMENTS

| | | | |
|---|---|---|---|
| 3,759,704 | 9/1973 | Culling | 420/588 |
| 3,874,938 | 4/1975 | Benjamin | 420/428 |
| 4,585,620 | 4/1986 | Kamohara et al. | 420/588 |

FOREIGN PATENT DOCUMENTS

| | | | |
|---|---|---|---|
| 0026219 | 3/1978 | Japan | 420/428 |
| 0115942 | 9/1980 | Japan | 420/428 |

OTHER PUBLICATIONS

Vreeland, et al., "Development of Materials Resistant to Wear and Corrosion for Mechanical Face-Seal Application", David Taylor Naval Ship Research & Development Center, Report 4299, (Nov. 1974).

*Primary Examiner*—L. Dewayne Rutledge
*Assistant Examiner*—David W. Schumaker
*Attorney, Agent, or Firm*—Luther A. Marsh

[57] ABSTRACT

A chromium based corrosion resistant alloy consisting of by weight percent: Cr-45–60; Ni-25–44; Mo-6.5–12; Cb-2.0–4.5; C-1.5–2.8; and Si-0.4–1.2. The alloy is suitable for weld deposition as a hard-facing on mechanical face seals in contact with sea water and subject to accelerating factors such as galvanic effects.

2 Claims, No Drawings

CHROMIUM BASED CORROSION RESISTANT HARD-FACING ALLOY

BACKGROUND OF THE INVENTION

1. Field of Invention

This invention relates to corrosion resistant alloys, particularly to corrosion resistant alloys in which chromium is the predominant element and more particularly to such an alloy structure useful as a weld depositable hard-facing on a mechanical face seal in contact with sea water. Applications for relative motion while being subjected to sea water require alloys that are highly resistant to sea water corrosion especially in the presence of accelerating factors such as galvanic effects. A submarine propeller shaft and a seal on underwater oil drilling apparatus are two examples of such uses.

2. Description of Prior Art

Prior seals, in the case of submarine shaft seals, have used a hard-facing, wear resistant alloy on a carrier ring, more particularly a cobalt containing weld deposited overlay on a Monel ring as the mating wear face. Unfortunately, the severe corrosion which occurs at the Monel-overlay interface threatens the integrity of the mating face. One solution for this corrosion problem is to use an insert of the hard-facing alloy electrically isolated and mechanically bonded into a machined groove in the Monel mating ring. The weld overlay type of construction at the weld interface is more desirable because it results in a more stable sealing face. An example of a corrosion resistant weld-deposited hard-facing alloy of the weld overlay type above is recorded in Vreeland, et al., "Development of Materials Resistant to Wear and Corrosion for Mechanical Face Seal Applications", David Taylor Naval Ship Research and Development Center Report 4299 (November 1974), herein incorporated by reference and cited as prior art by applicant. The composition disclosed therein is defined to consist of the following elements by weight percent: 2.9–3.1%-C, 42.5–45.5-Cr, 2.1–2.4-Cb, 6.9–7.2-Mo, 2.1–2.4-Fe, 0.6–0.75-Si, and 39.7–43.7-Ni. Another example of a hard-facing alloy that indicates good corrosion and wear properties under shaft seal conditions is a proprietary alloy known as Haynes Alloy N-6. The exacting proportions of this alloy are not publically known.

There is a continuing need for a hard-facing alloy material of known composition that provides improved resistance to sea water corrosion, especially in the presence of a galvanic environment.

OBJECTS OF THE INVENTION

An object of the present invention is to provide an improved hard-facing alloy that provides improved resistance to corrosion in the presence of sea water.

Another object of the present invention is to provide such an alloy that it exhibits such corrosion resistance in the presence of a galvanic environment.

A further object of the present invention provides an improved hard-facing alloy having the greater percentage of chromium therein, a small amount of silicon, and no iron.

A still further object of the present invention provides an improved hard-facing alloy having the greater percentage of chromium, a small amount of silicon, and no iron for use in ship's propeller shaft's seals utilizing a mechanical face seal.

These and other objects and advantages will be more fully understood from the following detailed description and examples all of which are intended to be typical of rather than in any way limiting on the scope of the present invention.

SUMMARY OF THE INVENTION

The improved hard-facing alloy of the present invention and which provides resistance to sea water corrosion especially in a galvanic environment consists essentially of, by weight percent, about 1.8–2.0-C, about 52–55-Cr, about 3–4-Cb, about 9–10-Mo, about 0.4–0.6-Si, and about 28.5–33.7 Ni.

DETAILED DESCRIPTION OF THE INVENTION

The corrosion resistance of an alloy to sea water compared with the resistance of other alloys to sea water is characterized by the current growth exhibited when a specimen is submerged in sea water and subjected to an anode potential which is 20 mv more positive than a quantity known as the protection potential. This anodic potential procedure is described in detail in Vreeland, et al., above, and is essentially as follows. A sample of the alloy is impressed against a Teflon O-ring to provide a crevice while the specimen is submerged in sea water in an apparatus suitable for flowing the sea water by the creviced sample. Suitale apparatus for applying an anodic potential and for measuring the current flow is also provided. Typically, the potential is increased in 100 mv steps with 2 minute pauses between steps until current growth is observed. If no current growth is observed for anodic potentials as high as 800 mv, that potential is held for a two hour test period. When the current at lower potentials is well defined, the potential is decreased until the current is suppressed, a value known as the protection potential. The specimen is then abrasively cleaned and tested for two hours at a potential 20 mv more positive than the protection potential. The rate of current increase during the two hour test period is used as the criteria to establish the relative corrosion resistance, it being generally accepted as the standard in alloy corrosion testing that the lower the anodic current, the better an alloy's resistance to sea water corrosion.

This method of testing was established as the generally accepted standard after comparing the results obtained thereby with corrosion behavior in two year sea water tests. Good agreement between the laboratory tests and the natural sea water tests was observed, and it was further observed that the laboratory tests were somewhat more stringent than the sea water tests. The comparison showed that the laboratory tests were dependable for determining those alloys that were substantially immune to localized sea water attack.

The alloys of the present invention are distinguished from the prior art alloy by characteristics which are more particularly described below. The alloy reported in Vreeland, et al., above, is substantially the same as the alloy designated as control in Table 1 set out below. Each of the alloys in Table 1 is formulated in a conventional manner as previously described in Vreeland, et al., above.

Referring now to Table 1, it is now apparent that alloys similar to the control composition but containing low carbon, Ranking 3, or low silicon, Ranking 7, no iron, Ranking 8, or high chromium, Ranking 2, have enhanced corrosion resistance. Similarly, alloys containing low molybdenum, Ranking 11, no columbium, Ranking 14, or high silicon, Ranking 15, have reduced corrosion resistance.

TABLE 1

RATE OF CURRENT INCREASE DURING CORROSION TESTS AND COMPOSITIONS (WEIGHT PERCENT) FOR ALLOYS

| Rate of I Increase, (mA/hr) | Casting Description | Test Ranking | C | Cr | Cb | Mo | Fe | Si | Ni |
|---|---|---|---|---|---|---|---|---|---|
| −0.005 | High Si, low C, no Fe | 1 | 1.0 | 45.0 | 2.3 | 6.5 | 0 | 1.0 | 44.2 |
| −0.005 | Low Ni, high Cr | 2 | 2.8 | 60.0 | 2.3 | 6.5 | 2.8 | 0.6 | 25.0 |
| 0.0 | Low C | 3 | 1.0 | 45.0 | 2.3 | 6.5 | 2.8 | 0.6 | 41.8 |
| 0.01 | Moderate C, no Fe | 4 | 1.5 | 45.0 | 2.3 | 6.5 | 0 | 0.6 | 44.1 |
| 0.05 | Haynes Alloy N-6* | 5 | —* | 29 | — | 6 | 3 max | 1.5 max | 59.5 |
| 0.15 | Low analysis except Ni | 6 | 2.0 | 40.0 | 2.0 | 5.5 | 2.0 | 0.5 | 48.0 |
| 0.18 | Low Si | 7 | 2.8 | 45.0 | 2.3 | 6.5 | 2.8 | 0.2 | 40.4 |
| 0.34 | No Fe | 8 | 2.8 | 45.0 | 2.3 | 6.5 | 0 | 0.6 | 42.8 |
| 0.50 | Low Cr, high Ni | 9 | 2.8 | 30.0 | 2.3 | 6.5 | 2.8 | 0.6 | 55.0 |
| 0.65 | Control | 10 | 2.8 | 45.0 | 2.3 | 6.5 | 2.8 | 0.6 | 40.0 |
| 0.85 | Low Mo | 11 | 2.8 | 45.0 | 2.3 | 3.5 | 2.8 | 0.6 | 43.0 |
| 1.00 | High analysis except Ni | 12 | 3.5 | 50.0 | 2.5 | 7.5 | 3.5 | 0.7 | 32.3 |
| 1.11 | High Si, no Fe | 13 | 2.8 | 45.0 | 2.3 | 6.5 | 0 | 1.0 | 42.4 |
| 1.65 | No Cb | 14 | 2.8 | 45.0 | 0 | 6.5 | 2.8 | 0.6 | 42.3 |
| 2.56 | High Si | 15 | 2.8 | 45.0 | 2.3 | 6.5 | 2.8 | 1.0 | 39.6 |

*Nominal Composition: C + B = 1.5% Mn = 1% max; Co = 3% max (4% max on Si + Fe + Mn + Co).

It is now further apparent that silicon, carbon, or iron, acting individually, are corrosion stimulators, while molybdenum, chromium or columbium are corrosion mitigators.

While the effect of each element individually is important, it is not as important as how the elements act in concert with each other. The favorable effect of low carbon and absence of iron is shown in Table 1 with the alloy of Ranking 1. The combination of the low carbon and absence of iron is sufficient to overcome the degrading effect of high silicon shown as Ranking 15, whereas the absence of iron without low carbon does not overcome the effect of high silicon as is shown in Ranking 13. Increasing the percentage of all elements uniformly while correspondingly reducing the percentage of nickel reduces the corrosion resistance, but, reducing the percentage of all elements uniformly while correspondingly increasing the percentage of nickel increases corrosion resistance, demonstrating that the beneficial effects of lower carbon, iron, and silicon overcome the desirable effects of higher chronium, columbium, and molybdenum. From these data it is more important from a corrosion resistant stand point to have low carbon, iron, and silicon than to have high chromium, columbium, and molybdenum. The beneficial effect of eliminating iron and moderating the carbon content is again shown in the alloy of Ranking 4 likewise the degrading effect of high silicon even in the absence of iron is shown in the alloy of Ranking 13.

The effect of nickel on the corrosion resistance of the control alloy is overshadowed by the effect of other elements in the alloy as described previously. Although alloys of Rankings 3, 7, 8, 10, 13 14, and 15 contain about the same amount of nickel, their rankings vary from near the top to the bottom in corrosion resistance properties. Thus, when acting alone, there is no systematic effect of nickel upon corrosion resistance of compositions similar to the control alloy.

The alloys of the present invention eliminate iron and include a moderate amount of carbon in order to form the required hard, wear-resistant particles needed in a hard-facing material. A minimal amount of silicon is retained in order to de-oxidize the melt and promote fluidity during the casting process. The amount of molybdenum with respect to nickel is increased conforming with common knowledge that molybdenum enhances the corrosion resistance of nickel alloys in sea water and the amount of columbium is increased beyond the percentage of the alloys shown in Table 1 to take advantage of the beneficial effects of columbium individually. Finally, the percentage of chromium is increased to take advantage of the known beneficial effect of chromium in combination with molybdenum and nickel.

Thus, it is observed that the preferable corrosion resistant alloy is chromium based alloy containing nickel, molybdenum, columbium, carbon, and silicon in descending order as to amount. Further, it is observed that the preferable amount by weight percent is as follows: Cr-45-60; Ni-25-44; Mo-6.4-12; Cb-2.0-4.5; C-1.5-2.8; and Si-0.4-1.2. And, the most preferable amount by weight percent is observed as follows: Cr-52-55; Ni-28.5-33.7; Mo-9-10; Cb-3-4; C-1.8-2.0; and Si-0.4-0.6.

The corrosion resistant hard-facing alloys of this invention are useful in mechanical face seal applications in which good wear properties and improved corrosion resistance are required.

Obviously, many modifications to this invention are possible in light of the above teachings. It is therefore to be understood that within the scope of the appended claims the invention may be practical otherwise than specifically described.

What is claimed is:

1. A chromium based alloy resistant to sea water corrosion consisting of by weight percent: Cr-45-60; Ni-25-44; Mo-6.5-12; Cb-2.0-4.5; C-1.5-2.8; and Si-0.4-1.2.

2. A chromium based alloy resistant to sea water corrosion consisting of by weight percent: Cr-52-55; Ni-28.5-33.7; Mo-9-10; Cb-3-4; C-1.8-2.0; and Si-0.4-0.6.

* * * * *